United States Patent [19]

Sudo

[11] 4,194,762
[45] Mar. 25, 1980

[54] KNEE PROTECTING DEVICE FOR OCCUPANT OF VEHICLE

[75] Inventor: Yoichi Sudo, Toyota, Japan

[73] Assignee: Toyota Jidosha Kogyo Kabushiki Kaisha, Toyota, Japan

[21] Appl. No.: 931,931

[22] Filed: Aug. 8, 1978

[30] Foreign Application Priority Data

Aug. 8, 1977 [JP] Japan ............................ 52/105928[U]

[51] Int. Cl.² .............................................. B60R 21/08
[52] U.S. Cl. ...................................... 280/751; 188/1 C
[58] Field of Search ............... 280/751, 750; 180/90; 188/1 C

[56] References Cited

U.S. PATENT DOCUMENTS

| | | |
|---|---|---|
| 3,930,665 | 1/1976 | Ikawa ................................... 280/751 |
| 3,964,578 | 6/1976 | Campbell et al. ..................... 280/752 |
| 4,065,157 | 12/1977 | Abe et al. ............................. 280/751 |

Primary Examiner—Robert R. Song
Attorney, Agent, or Firm—Stevens, Davis, Miller & Mosher

[57] ABSTRACT

An impact energy absorbing device provided in the passenger compartment of a vehicle for protecting the occupant of the vehicle from injury caused by impact in a collision or other vehicle accident. A knee protecting device is disclosed having a knee pad disposed between protrusions formed in the passenger compartment and the knees of the occupant. The impact energy absorbing device which is pressed and deformed by the knees of the occupant in a collision or other vehicle accident is positioned between the knee pad and the protrusions in the passenger compartment.

13 Claims, 4 Drawing Figures

KNEE PROTECTING DEVICE FOR OCCUPANT OF VEHICLE

BACKGROUND OF THE INVENTION

1. Field of the Invention

The present invention relates to an impact energy absorbing device provided in the passenger compartment of a vehicle for protecting an occupant or occupants from injury caused by impact in a collision or other vehicle accident, and particularly to improvements in a knee protecting device for the occupant of the vehicle, wherein a knee pad is disposed between protrusions formed in the passenger compartment of the vehicle and the knees of the occupant.

2. Description of the Prior Art

A gas bag device has been developed for buffering impacts on the driver of the vehicle in a collision or other vehicle accident. This device is adapted to expand the gas bag to restrain the driver in a collision or other vehicle accident, thereby protecting the driver. If a vehicle equipped with this gas bag is involved in a collision or other vehicle accident, the head, chest and the like of the driver will be satisfactorily protected by the gas bag. However, the knees of the driver strike the lower portion of the instrument panel. Consequently, a knee pad is frequently provided close to the position where the knees strike the lower portion of the instrument panel so that impact energy acting on the knees is absorbed.

However, with the conventional knee protecting device wherein only the knee pad is disposed between the protrusions in the passenger compartment and the knees of the driver, the knees of the driver, directly opposed to the hard protrusions in the passenger compartment such as a steering column tube or a breakaway bracket, are not satisfactorily protected. In a vehicle having a steering wheel on the left side, the right knee of the driver is further from the column tube and breakaway bracket, and hence, the impact load on that knee is low, so that satisfactory protective performance for the knee can be obtained with a knee protecting device like a conventional one. However, the left knee is very close to the aforesaid column tube and breakaway bracket and directly opposed thereto, and hence, the knee protecting device is required to have high protective performance for that knee. In order to improve the impact absorbing performance of the knee pad, efforts have been made to increase the thickness of the knee pad or to soften the knee pad by slitting it or the like. With the former method, i.e., increasing the thickness of the knee pad, movement of the left knee of the driver is restrained. As a result, driving is hindered and it is difficult for the driver to get into and out of the vehicle. Additionally, with the latter method, i.e., softening the knee pad, for the right knee, impact energy can be satisfactorily absorbed because the amount of deflection of the knee pad can be allowed to be high. However, for the left knee, which can directly strike the breakaway bracket and the like, a heavy load can be placed on that knee and the driver cannot be satisfactorily protected because the amount of allowable deflection of the knee pad on that side is only slight. The allowable deflection on that side is less than that on the right side.

SUMMARY OF THE INVENTION

The present invention is intended to obviate the aforesaid disadvantages of the prior art, and the general object of the present invention is to provide a knee protecting device for an occupant or occupants of a vehicle, wherein impact energy can be reliably absorbed over a short distance.

Another object of the present invention is to provide various impact energy absorbing members, each constituting the aforesaid knee protecting device.

A further object of the present invention is to provide impact energy absorbing members whose impact energy absorbing characteristics are readily changeable.

The present invention achieves the aforesaid objects in a manner that, in the knee protecting device for the occupant of the vehicle wherein a knee pad is disposed between the protrusions in the passenger compartment and the knees of the occupant, an impact absorbing member, which is pressed and deformed by the knees of the occupant in a collision or other vehicle accident is disposed between the protrusions in the passenger compartment and the knee pad, so that the impact load acting on the knees of the occupant can be reliably absorbed over a short distance.

Further, the present invention provides various impact absorbing members constituting the aforesaid knee protecting device, such as a metal pipe, a laminated structure of a multiplicity of small diameter metal pipes circular in section, a honeycomb-like laminated structure of a multiplicity of small diameter metal pipes polygonal in section, a sintered metal block provided therein with a multiplicity of cavities, a hard plastic resin block provided therein with a multiplicity of cavities, or a hard plastic resin pipe.

Still further, the present invention provides impact energy absorbing members whose impact energy absorbing characteristics are readily changeable by forming the impact energy absorbing member constituting the aforesaid knee protecting device into a pipe or pipes provided therein with a slit or slits.

BRIEF DESCRIPTION OF THE DRAWINGS

The above-mentioned features and objects of the present invention will become more apparent by reference to the following description taken in conjunction with the accompanying drawings, wherein like reference numerals denote like elements, and in which.

DETAILED DESCRIPTION OF THE INVENTION

Detailed description will hereunder be given of the embodiments of the present invention with reference to the drawings. Although the invention is described on a vehicle with a steering wheel on the left side, of course, the invention can also be used in a vehicle having a steering wheel on the right side.

Figure 1:
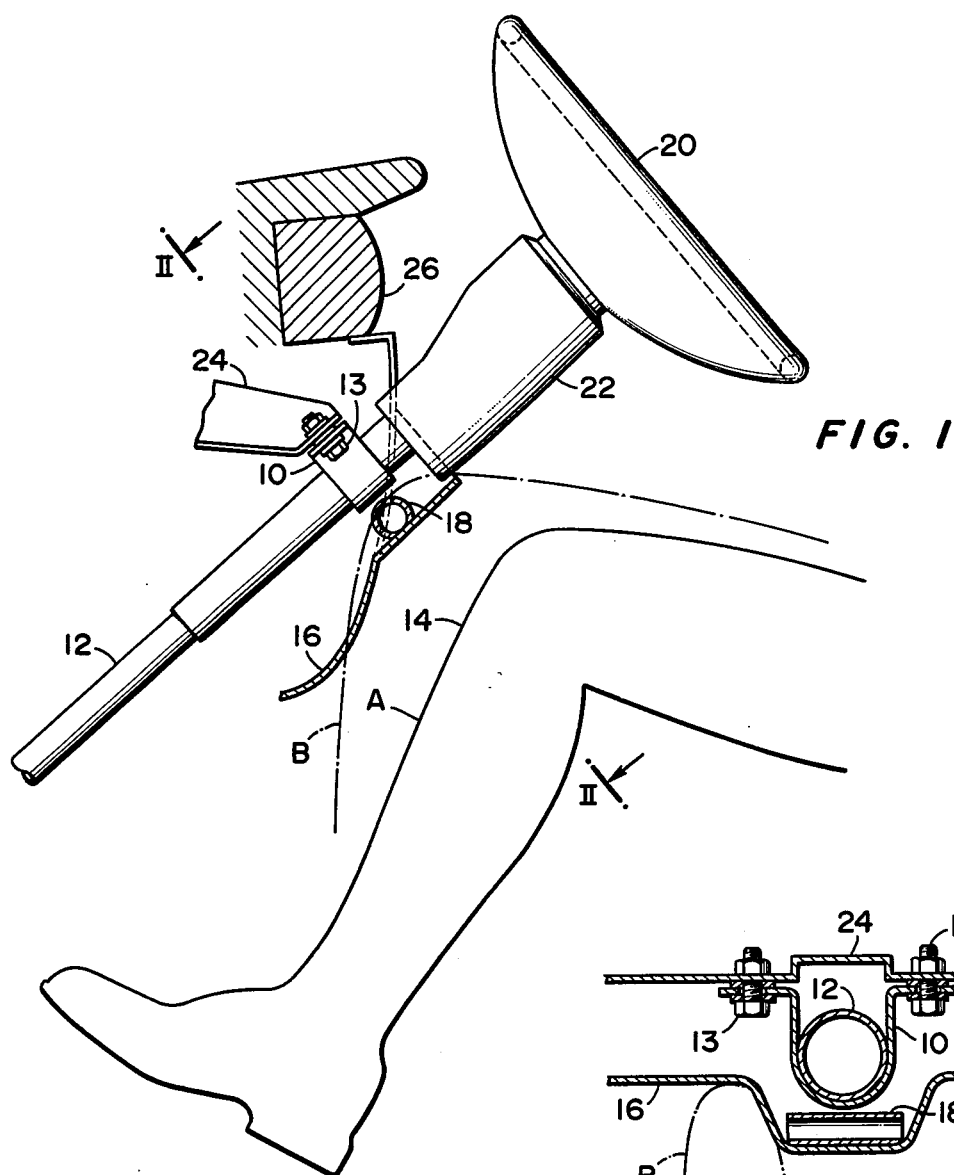
FIG. 1 is a sectional view showing the driver's seat of the vehicle having a left side steering wheel to which the knee protecting device according to the present invention is related.
Figure 2:
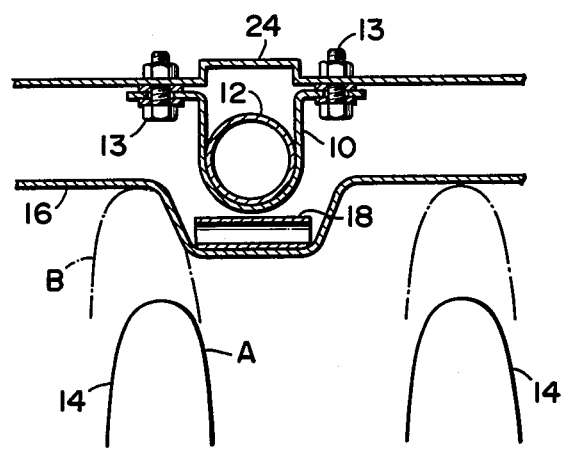
FIG. 2 is a sectional view taken along the line II—II in FIG. 1.

As shown in FIGS. 1 and 2, an impact energy absorbing member 18 is provided on the rear surface of a knee pad 16 disposed between a steering column bracket 10, a steering column tube 12 and a bracket fixing bolt 13 (projections in the passenger compartment) and the knees 14 of the driver. Also shown in FIG. 1 is a steering wheel 20 with a gas bag, a column cover 22, the body 24 of the vehicle and an instrument panel 26.

As shown in FIG. 2, the knee pad 16 extends transversely across the adjacent the steering column 12 between it and the knees of the driver. The knee pad 16 includes a generally U-shaped central region which is spaced a short distance from and partly surrounds the steering column 12. The impact energy absorbing member 18 is elongated, extends transversely, and is in abutment with and substantially coextensive with the bight of the U-shaped central region of the knee pad.

Figure 3:
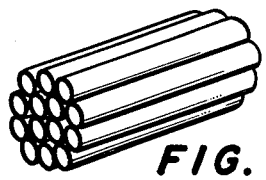
FIGS. 3 and 4 are perspective views showing other examples of the impact energy absorbing member.
Figure 4:
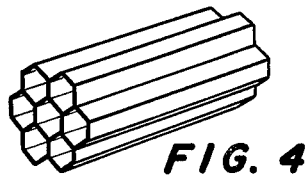

The above impact energy absorbing member 18 can be made of a metal pipe provided therein with a slit or slits for adjusting the impact load for example, and is disposed at the rear surface of the knee pad 16 and perpendicular to the steering column tube 12, at a position where the left knee of the driver may strike the protrusions in the passenger compartment in a collision of other vehicle accident. The impact energy absorbing member 18 may also comprise a metal pipe without a slit or slits, a laminated structure of a multiplicity of small diameter metal pipes circular in section as shown in FIG. 3, a honeycomb-like laminated structure of a multiplicity of small diameter metal pipes polygonal in section as shown in FIG. 4, a sintered metal block provided therein with a multiplicity of cavities, a hard plastic resin pipe, or a hard plastic resin block provided therein with a multiplicity of cavities and the like.

The invention operates and functions as follows. Under normal conditions, the knees 14 of the driver are in the position shown by solid lines A in FIGS. 1 and 2, i.e., there is a sufficient distance between the knees 14 and the knee pad 16. Hence, under normal driving conditions, driving by the driver is not hindered and it is relatively easy for him to get into and out of the vehicle. In the event of a collision or other vehicle accident, the gas bag provided on the steering wheel 20 expands, and as a result, the chest and head of the driver of the vehicle are restrained for protection. However, the knees of the driver are not restrained at all and move towards the steering column tube 12, as shown by the lines B in FIGS. 1 and 2, and strike the knee pad 16. The load acting on the knees 14 is gradually absorbed during the period of time from the abutting of the knees against the surface of the knee pad 16 to the complete collapse of the impact energy absorbing member 18. As a result, no heavy load directly acts on the knees.

In addition, by properly selecting the quality of the material, size and the like of the impact energy absorbing member, the knees 14 do not directly strike the steering column bracket 10, the steering column tube 12 or the bracket fixing bolt 13 in a collision or other vehicle accident.

In the present embodiment, the impact energy absorbing member is made of a tubular body or bodies perpendicular to the steering column tube 12, the main protrusion in the passenger compartment. Hence, even if the position of the steering column tube 12 relative to the driver of the vehicle or the knee pad 16 shifts or changes, the knees of the driver can be reliably protected.

Additionally, in the present embodiment, a metal pipe or pipes are used as the impact energy absorbing member, and therefore the required impact energy absorbing characteristics of the member can be readily obtained by adjusting the wall thickness of pipe, the length and position of a slit or slits and the like. Also, the outer diameter of the pipe can be suitably selected in accordance with the allowable impact energy absorbing stroke, i.e., the distance between the knee pad and the protrusions in the passenger compartment.

Furthermore, in the above embodiment, a knee pad similar to a conventional one is used. However, with a vehicle having a steering wheel on the left side, if the impact load acting on the left knee of the driver is very heavy as compared with the impact load acting on the right knee, the effects of the present invention can be improved further by increasing the rigidity of the knee pad adjacent to the portion against which the right knee collides to shift the share of the load from the left knee to the right knee to thereby more evenly distribute the load.

In addition, in the above embodiment, the present invention is applied to a vehicle with a steering wheel on the left side with a gas bag device. It should be understood, however, that there is no intention to limit the invention to this specific form disclosed. To the contrary, it is apparent that the present invention can be applied to a vehicle having the seat belt system. Also, the knee protecting device can be used alone. Furthermore, the present invention is applicable in protecting not only the driver of the vehicle but a passenger or passengers of the vehicle. As mentioned earlier, of course, the present invention can be applied to a vehicle with a steering wheel on the right side.

From the foregoing description, it should be apparent to one skilled in the art that the above-described embodiment is but one of many possible specific embodiments which can represent the applications of the principles of the present invention. Numerous and varied other arrangements can be readily devised by those skilled in the art without departing from the spirit and scope of the invention.

What is claimed is:

1. In a vehicle having a passenger compartment with a rigid part protruding therein toward a passenger, the improvement comprising a knee protecting device for the passenger, said device comprising:
   a knee pad extending transversely across and adjacent the part between it and the knee of the passenger, said knee pad comprising a region intermediate the transverse ends thereof generally U-shaped in transverse cross-section, spaced a short distance from and partly surrounding the part; and
   an elongated transversely extending impact energy absorbing member between the knee pad and the part, said member being in abutment with and substantially transversely coextensive with the bight of the U-shaped region of the knee pad and being deformable upon impact by the knees in a collision.

2. The invention of claim 1, characterized in that said impact energy absorbing member comprises a metal pipe.

3. The invention of claim 2, characterized in that said metal pipe has at least one slit therein for changing the impact energy absorbing characteristics.

4. The invention of claim 1, characterized in that said impact energy absorbing member comprises a laminated structure of a multiplicity of small diameter metal pipes circular in section.

5. The invention of claim 4, characterized in that said small diameter metal pipes have at least one slit therein for changing the impact energy absorbing characteristics.

6. The invention of claim 1, characterized in that said impact energy absorbing member comprises a honeycomb-like laminated structure of metal pipes polygonal in section.

7. The invention of claim 6, characterized in that said small diameter metal pipes have at least one slit therein for changing the impact energy absorbing characteristics.

8. The invention of claim 1, characterized in that said impact energy absorbing member comprises a sintered metal block provided therein with a multiplicity of cavities.

9. The invention of claim 1, characterized in that said impact energy absorbing member comprises at least one hard plastic resin pipe.

10. The invention of claim 9, characterized in that said at least one pipe has at least one slit defined therein for changing the impact energy absorbing characteristics.

11. The invention of claim 1, characterized in that said impact energy absorbing member comprises a hard plastic resin blocked provided therein with a multiplicity of cavities.

12. In a vehicle having a passenger compartment with a steering column, the improvement comprising a knee protecting device for the driver, said device comprising:
a knee pad extending transversely across and adjacent the steering column between it and the knees of the driver, said knee pad comprising a central region generally U-shaped in transverse cross-section, spaced a short distance from and partly surrounding the steering column; and
an elongated substantially horizontally transversely extending impact energy absorbing conduit between the knee pad and the steering column, said conduit being in abutment with and substantially transversely coextensive with the bight of the U-shaped central region of the knee pad and being deformable upon impact by the knees in a collision.

13. The invention of claim 12, wherein:
said impact energy absorbing conduit is hollow and is made of an elastically deformable material.

* * * * *